United States Patent
Hausler et al.

(10) Patent No.: US 10,579,222 B2
(45) Date of Patent: Mar. 3, 2020

(54) KEYBOARD ACCESS TO HOVER FUNCTIONALITY

(71) Applicant: salesforce.com, inc., San Francisco, CA (US)

(72) Inventors: Jesse Hausler, San Francisco, CA (US); Antoni Tonev, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 55 days.

(21) Appl. No.: 15/597,740

(22) Filed: May 17, 2017

(65) Prior Publication Data
US 2018/0335897 A1 Nov. 22, 2018

(51) Int. Cl.
| | |
|---|---|
| *G06F 3/0482* | (2013.01) |
| *G06F 3/0481* | (2013.01) |
| *G06F 3/0489* | (2013.01) |
| *G06F 3/0484* | (2013.01) |

(52) U.S. Cl.
CPC .......... *G06F 3/0482* (2013.01); *G06F 3/0481* (2013.01); *G06F 3/04812* (2013.01); *G06F 3/04817* (2013.01); *G06F 3/04892* (2013.01); *G06F 3/04842* (2013.01)

(58) Field of Classification Search
CPC .......... G06F 17/2235; G06F 17/30014; G06F 17/30418; G06F 17/30997; G06F 3/04817; G06F 3/0482; G06F 3/04842; G06F 3/04892; G06F 3/0481; G06F 3/04812; G06F 3/0487; G06F 2203/04804; G06F 3/02; G06F 3/0483
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |

(Continued)

OTHER PUBLICATIONS

Marieke McCloskey, "Keyboard-Only Navigation for Improved Accessibility", Apr. 6, 2014, NN/g Nielsen Norman Group, pp. 10 (Year: 2014).*

*Primary Examiner* — Chau T Nguyen
(74) *Attorney, Agent, or Firm* — Lowenstein Sandler LLP

(57) ABSTRACT

A system as provided includes a processing device, a memory coupled to the processing device, the memory to store instructions, a keyboard device coupled to the processing device, and a graphical user interface (GUI) including a display. The processing device is to execute the instructions to: retrieve a set of menu entries including a link and a hidden icon that are selectable to access an electronic file, display the link on the display, and display the hidden icon adjacent to the link on the display. The processing device may further receive a menu entry selection signal indicative of the keyboard device highlighting the hidden icon with a tab action and make the hidden icon visible within the display in response to the menu entry selection signal.

14 Claims, 11 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson |
| 9,798,450 B1* | 10/2017 | Urasaki ............... G06F 3/04842 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0136678 A1* | 6/2007 | Brown ................ G06F 9/451 715/771 |
| 2010/0199215 A1* | 8/2010 | Seymour ............... G06F 3/0481 715/808 |
| 2011/0083067 A1* | 4/2011 | Shim ................... G06F 16/957 715/200 |
| 2012/0011588 A1* | 1/2012 | Milener .................. G06F 21/51 726/24 |
| 2012/0167010 A1* | 6/2012 | Campbell ......... G06F 17/30828 715/825 |
| 2013/0246904 A1* | 9/2013 | Seliger .................. G06F 3/0481 715/234 |
| 2015/0160788 A1* | 6/2015 | Sun ..................... G06F 3/04817 715/746 |
| 2015/0289022 A1* | 10/2015 | Gross ................. H04N 21/4725 725/51 |
| 2016/0342593 A1* | 11/2016 | Raichelgauz ....... G06F 16/9535 |

* cited by examiner

| FEED | DETAILS | | ✕ |
|---|---|---|---|

| | |
|---|---|
| Parent Case<br>00001005 | Status<br>New |
| Case Owner<br>Admin User | Priority<br>P5 |
| Case Number<br>00001007 | Contact Phone |
| Contact Name<br>Da Scs Agent | Contact Email |
| Account Name<br>Aetna Inc. | Case Origin<br>Twitter |
| Type<br>Help Request | Defect Number |
| Case Reason<br>Instructions Not Clear | |
| Web Email<br>user@dascs.com | Web Company<br>DaScs.com |
| Web Name | Web Phone |
| Date/Time Opened<br>3/23/2017 4:47 PM | Date/Time Closed |
| | Version |
| Created By<br>Admin User, 3/23/2017 4:47 PM | Last Modified By<br>Admin User, 4/14/2017 4:17 PM |
| Subject<br>TWEET FROM: DaScsAgent | |
| Description | |

KEYBOARD ACCESS TO HOVER FUNCTIONALITY

COPYRIGHT NOTICE

Portions of the disclosure of this patent document may contain material subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to alternative to mouse hovering and, more particularly, to providing hover functionality through a keyboard or keyboard-like device.

BACKGROUND

When a user accesses software programs, whether installed locally on a computing device or on a server (e.g., in the cloud), the user may interact with the software programs through a graphical user interface (GUI) that includes a display, which is visible to the user. These software programs may also function within a web browser to access functionality provided by the server. More and more, GUI-based functions are provided via hover functionality, such as displaying in a pop-up or overlay window to a user upon a mouse hovering over a particular link.

BRIEF DESCRIPTION OF THE DRAWINGS

The included drawings are for illustrative purposes and serve to provide examples of possible structures and operations for disclosed systems, apparatus, methods and computer-readable storage media. These drawings in no way limit any changes in form and detail that may be made by one skilled in the art without departing from the spirit and scope of the disclosed implementations.

FIG. 2C is a screen shot of the GUI display and an overlay window (of the electronic file) that has popped up responsive to a keyboard action on the hidden icon of FIG. 2B, according to some implementations.

FIG. 3C is a screen shot of the GUI display and an overlay window that has popped up responsive to the hover target being highlighted for a predetermined period of time, according to some implementations.

FIG. 4B is a screen shot of an exemplary database record, which may also be an overlay window, according to various implementations.

DETAILED DESCRIPTION

Figure 1A:
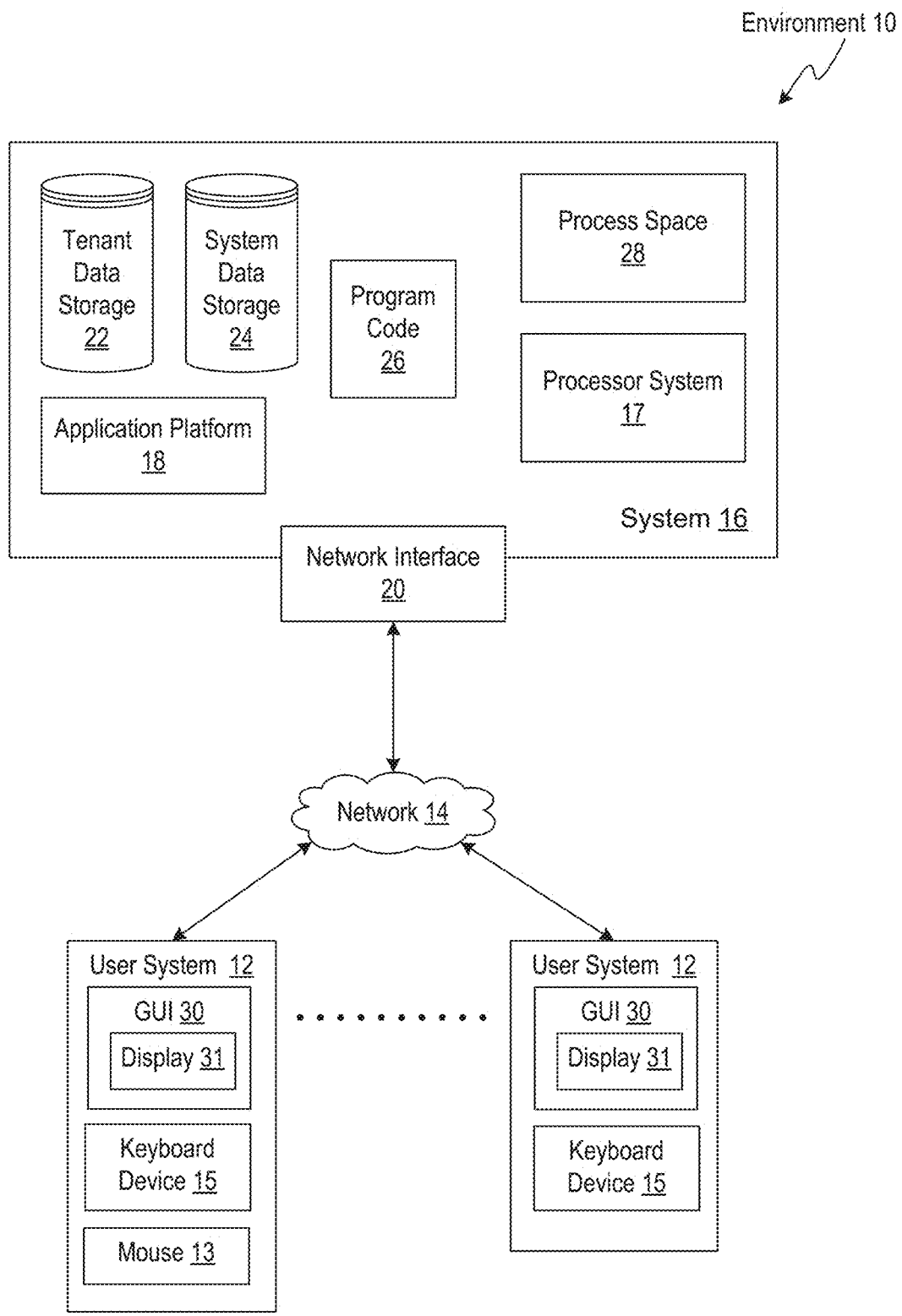
FIG. 1A is a block diagram illustrating an example environment in which an on-demand database service may be used according to some implementations.

Examples of systems, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B, or C" is intended to include the possibilities of "A," "B," "C," "A and B," "B and C," "A and C," and "A, B, and C."

The implementations described herein are directed at enhanced hover functionality provided within a software program such as previously discussed. At times, a user may not have a mouse device attached to a computer system or device, or a user may not be able to use the mouse device because the user is blind or vision impaired to the extent that the user cannot track the mouse action within a display of a graphical user interface (GUI). In such cases, the user may not be able to access hover functionality that normally is only available upon hovering a cursor of the mouse device over a particular, identifiable link.

As an alternative to mouse device hover triggering, the present disclosure provides implementations by which the user may use a keyboard device (or similar device) to access hover functionality. In one implementation, a menu entry such as a link displayed on the GUI display may include a hover target. The hover target may allow a tab action (or a shortcut key in a different implementation) to highlight or otherwise move onto the hover target. Upon passage of a predetermined amount of time (e.g., 2-3 seconds), an overlay window (e.g., a pop-up window) may appear to provide hover functionality through the overlay window.

Alternatively, an additional menu entry described herein as a hidden icon may be displayed adjacent to the link on the GUI display. The hidden icon remains hidden even upon a mouse device moving a cursor over the hidden icon. Upon a certain keyboard action through the keyboard device (such as a tab action) may move the cursor to highlight (or put into focus) the hidden icon, which then becomes visible. When the user presses the enter key or return key, for example, the overlay window may be displayed and become functional. Once the overlay window is displayed, hover functionality within the overlay window becomes available to the user, as will be explained in detail, also through the keyboard device (and variably through a mouse as well).

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system, related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with the system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a mouse 13, a keyboard device 15, a trackball, a touch pad, a touch screen (which may implement a keyboard device in some cases), a pen or stylus or the other mouse-like substitute, for interacting with a graphical user interface (GUI) 30 provided by the browser on a display (for example, a monitor screen, liquid crystal display (LCD), light-emitting diode (LED) display, or other display 31) of the user system 12 in conjunction with pages, forms, applications and other information provided by the system 16 or other systems or servers. In some implementations, the mouse 13 is unavailable or not useable by a user of the user system 12, and so the keyboard device 15 may become the main input device of a user. Furthermore, the user interface device can be used to access data and applications hosted by system 16, and to perform searches on stored data, and otherwise allow a user to interact with various GUI pages that may be presented to a user, whether executed locally on the user system 12 or remotely on the system 16. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
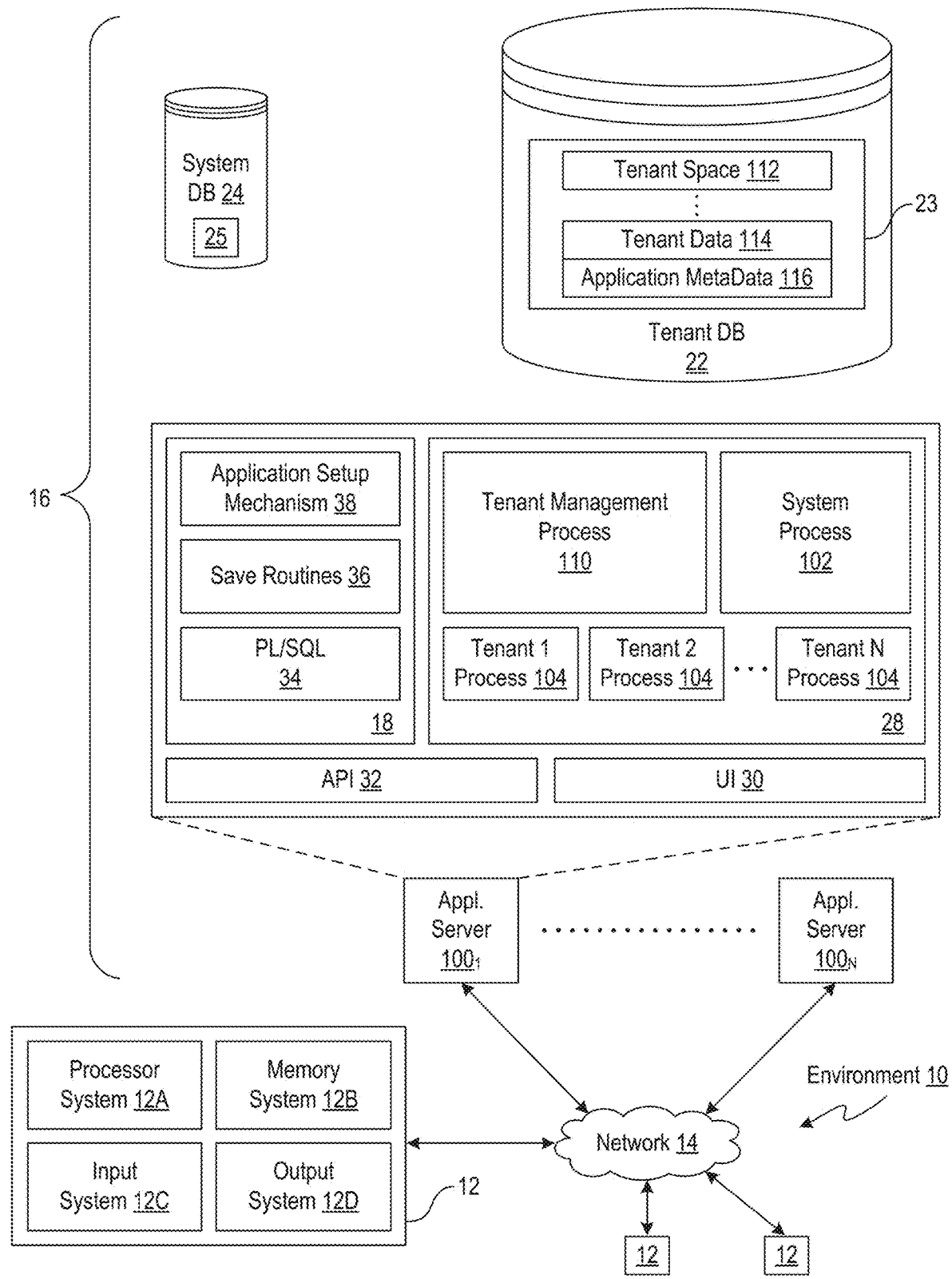
FIG. 1B is a block diagram illustrating example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server," is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SQL 34, which provides a programming language style interface extension to API 32. A detailed description of some PL/SQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety. Invocations to applications can be detected by one or more system processes, which manage retrieving application metadata 116 for the subscriber making the invocation and executing the metadata as an application in a virtual machine.

The system 16 of FIG. 1B may also include a user interface (UI) 30 and an application programming interface (API) 32 to system 16 resident processes available to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which the system 16 handles storage of, and access to, different objects, data and applications across disparate users and organizations.

In one example storage use case, one tenant can be a company that employs a sales force where each salesperson uses the system 16 to manage aspects of their sales. A user can maintain contact data, leads data, customer follow-up data, performance data, goals and progress data, etc., all applicable to that user's personal sales process (for example, in the tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems 12. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by the system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to a tenant database 22 or a system database 24. The system 16 (for example, an application server 100 in the system 16) can automatically generate one or more SQL statements (for example, one or more SQL queries) designed to access the desired information. The system database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

In some implementations, some of the methods, processes, devices and systems described herein can implement, or be used in the context of, enterprise social networking. Some online enterprise social networks can be implemented in various settings, including businesses, organizations and other enterprises (all of which are used interchangeably herein). For instance, an online enterprise social network can be implemented to connect users within a business corporation, partnership or organization, or a group of users within such an enterprise. For instance, Chatter® can be used by users who are employees in a business organization to share data, communicate, and collaborate with each other for various enterprise-related purposes. Some of the disclosed methods, processes, devices, systems and computer-readable storage media described herein can be configured or designed for use in a multi-tenant database environment, such as described above with respect to system 16. In an example implementation, each organization or a group within the organization can be a respective tenant of the system.

In some implementations, each user of the database system 16 is associated with a "user profile." A user profile refers generally to a collection of data about a given user. The data can include general information, such as a name, a title, a phone number, a photo, a biographical summary, or a status (for example, text describing what the user is currently doing, thinking or expressing). As described below, the data can include messages created by other users. In implementations in which there are multiple tenants, a user is typically associated with a particular tenant (or "organization"). For example, a user could be a salesperson of an organization that is a tenant of the database system 16.

A "group" generally refers to a collection of users within an organization. In some implementations, a group can be defined as users with the same or a similar attribute, or by membership or subscription. Groups can have various visibilities to users within an enterprise social network. For example, some groups can be private while others can be public. In some implementations, to become a member within a private group, and to have the capability to publish and view feed items on the group's group feed, a user requests to be subscribed to the group (and be accepted by, for example, an administrator or owner of the group), is invited to subscribe to the group (and accept), or is directly subscribed to the group (for example, by an administrator or owner of the group). In some implementations, any user within the enterprise social network can subscribe to or follow a public group (and thus become a "member" of the public group) within the enterprise social network.

A "record" generally refers to a data entity, such as an instance of a data object created by a user or group of users of the database system 16. Such records can include, for example, data objects representing and maintaining data for accounts, cases, opportunities, leads, files, documents, orders, pricebooks, products, solutions, reports and forecasts, among other possibilities. For example, a record can be for a business partner or potential business partner (for example, a client, vendor, distributor, and the like) of a user or a user's organization, and can include information describing an entire enterprise, subsidiaries of an enterprise, or contacts at the enterprise. As another example, a record can be a project that a user or group of users is/are working on, such as an opportunity (for example, a possible sale) with an existing partner, or a project that the user is trying to obtain. A record has data fields that are defined by the structure of the object (for example, fields of certain data types and purposes). A record also can have custom fields defined by a user or organization. A field can include (or include a link to) another record, thereby providing a parent-child relationship between the records.

Records also can have various visibilities to users within an enterprise social network. For example, some records can be private while others can be public. In some implementations, to access a private record, and to have the capability to publish and view feed items on the record's record feed, a user must request to be subscribed to the record (and be accepted by, for example, an administrator or owner of the record), be invited to subscribe to the record (and accept), be directly subscribed to the record or be shared the record (for example, by an administrator or owner of the record). In some implementations, any user within the enterprise social network can subscribe to or follow a public record within the enterprise social network.

In some online enterprise social networks, users also can follow one another by establishing "links" or "connections" with each other, sometimes referred to as "friending" one another. By establishing such a link, one user can see information generated by, generated about, or otherwise associated with another user. For instance, a first user can see information posted by a second user to the second user's profile page. In one example, when the first user is following the second user, the first user's news feed can receive a post from the second user submitted to the second user's profile feed.

In some implementations, users can access one or more enterprise network feeds (also referred to herein simply as "feeds"), which include publications presented as feed items or entries in the feed. A network feed can be displayed in the graphical user interface (GUI) 30 on a display device such as the display 31 of a user's computing device as described above. The publications can include various enterprise social network information or data from various sources and can be stored in the database system 16, for example, in tenant database 22. In some implementations, feed items of information for or about a user can be presented in a respective user feed, feed items of information for or about a group can be presented in a respective group feed, and feed items of information for or about a record can be presented in a respective record feed. A second user following a first user, a first group, or a first record can automatically receive the feed items associated with the first user, the first group or the first record for display in the second user's news feed. In some implementations, a user feed also can display feed items from the group feeds of the groups the respective user subscribes to, as well as feed items from the record feeds of the records the respective user subscribes to.

The term "feed item" (or feed element) refers to an item of information, which can be viewable in a feed. Feed items can include publications such as messages (for example, user-generated textual posts or comments), files (for example, documents, audio data, image data, video data or other data), and "feed-tracked" updates associated with a user, a group or a record (feed-tracked updates are described in greater detail below). A feed item, and a feed in general, can include combinations of messages, files and feed-tracked updates. Documents and other files can be included in, linked with, or attached to a post or comment. For example, a post can include textual statements in combination with a document. The feed items can be organized in chronological order or another suitable or desirable order (which can be customizable by a user) when the associated feed is displayed in a graphical user interface (GUI), for instance, on the user's computing device.

Messages such as posts can include alpha-numeric or other character-based user inputs such as words, phrases, statements, questions, emotional expressions, or symbols. In some implementations, a comment can be made on any feed item. In some implementations, comments are organized as a list explicitly tied to a particular feed item such as a feed-tracked update, post, or status update. In some implementations, comments may not be listed in the first layer (in a hierarchal sense) of feed items, but listed as a second layer branching from a particular first layer feed item. In some implementations, a "like" or "dislike" also can be submitted in response to a particular post, comment or other publication.

A "feed-tracked update," also referred to herein as a "feed update," is another type of publication that may be presented as a feed item and generally refers to data representing an event. A feed-tracked update can include text generated by the database system in response to the event, to be provided as one or more feed items for possible inclusion in one or more feeds. In one implementation, the data can initially be stored by the database system in, for example, tenant database 22, and subsequently used by the database system to create text for describing the event. Both the data and the text can be a feed-tracked update, as used herein. In some implementations, an event can be an update of a record and can be triggered by a specific action by a user. Which actions trigger an event can be configurable. Which events have feed-tracked updates created and which feed updates are sent to which users also can be configurable. Messages and feed updates can be stored as a field or child object of a record. For example, the feed can be stored as a child object of the record.

As described above, a network feed can be specific to an individual user of an online social network. For instance, a user news feed (or "user feed") generally refers to an aggregation of feed items generated for a particular user, and in some implementations, is viewable only to the respective user on a home page of the user. In some implementations a user profile feed (also referred to as a "user feed") is another type of user feed that refers to an aggregation of feed items generated by or for a particular user, and in some implementations, is viewable only by the respective user and other users following the user on a profile page of the user. As a more specific example, the feed items in a user profile feed can include posts and comments that other users make about or send to the particular user, and status updates made by the particular user. As another example, the feed items in a user profile feed can include posts made by the particular user and feed-tracked updates initiated based on actions of the particular user.

As is also described above, a network feed can be specific to a group of enterprise users of an online enterprise social network. For instance, a group news feed (or "group feed") generally refers to an aggregation of feed items generated for or about a particular group of users of the database system 16 and can be viewable by users following or subscribed to the group on a profile page of the group. For example, such feed items can include posts made by members of the group or feed-tracked updates about changes to the respective group (or changes to documents or other files shared with the group). Members of the group can view and post to a group feed in accordance with a permissions configuration for the feed and the group. Publications in a group context can include documents, posts, or comments. In some implementations, the group feed also includes publications and other feed items that are about the group as a whole, the group's purpose, the group's description, a status of the group, and group records and other objects stored in association with the group. Threads of publications including updates and messages, such as posts, comments, likes, and the like, can define conversations and change over time. The following of a group allows a user to collaborate with other users in the group, for example, on a record or on documents or other files (which may be associated with a record).

As is also described above, a network feed can be specific to a record in an online enterprise social network. For instance, a record news feed (or "record feed") generally refers to an aggregation of feed items about a particular record in the database system 16 and can be viewable by users subscribed to the record on a profile page of the record. For example, such feed items can include posts made by users about the record or feed-tracked updates about changes to the respective record (or changes to documents or other files associated with the record). Subscribers to the record can view and post to a record feed in accordance with a permissions configuration for the feed and the record. Publications in a record context also can include documents, posts, or comments. In some implementations, the record feed also includes publications and other feed items that are about the record as a whole, the record's purpose, the record's description, and other records or other objects stored in association with the record. Threads of publications including updates and messages, such as posts, comments, likes, etc., can define conversations and change over time. The following of a record allows a user to track the progress of that record and collaborate with other users subscribing to the record, for example, on the record or on documents or other files associated with the record.

In some implementations, data is stored in database system 16, including tenant database 22, in the form of "entity objects" (also referred to herein simply as "entities"). In some implementations, entities are categorized into "Records objects" and "Collaboration objects." In some such implementations, the Records object includes all records in the enterprise social network. Each record can be considered a sub-object of the overarching Records object. In some implementations, Collaboration objects include, for example, a "Users object," a "Groups object," a "Group-User relationship object," a "Record-User relationship object" and a "Feed Items object."

In some implementations, the Users object is a data structure that can be represented or conceptualized as a "Users Table" that associates users to information about or pertaining to the respective users including, for example, metadata about the users. In some implementations, the Users Table includes all of the users within an organization. In some other implementations, there can be a User's Table for each division, department, team or other sub-organization within an organization. In implementations in which the organization is a tenant of a multi-tenant enterprise social network platform, the Users Table can include all of the users within all of the organizations that are tenants of the multi-tenant enterprise social network platform. In some implementations, each user can be identified by a user identifier ("UserID") that is unique at least within the user's respective organization. In some such implementations, each organization also has a unique organization identifier ("OrgID").

In some implementations, the Groups object is a data structure that can be represented or conceptualized as a "Groups Table" that associates groups to information about or pertaining to the respective groups including, for example, metadata about the groups. In some implementations, the Groups Table includes all of the groups within the organization. In some other implementations, there can be a Groups Table for each division, department, team or other sub-organization within an organization. In implementations in which the organization is a tenant of a multi-tenant enterprise social network platform, the Groups Table can include all of the groups within all of the organizations that are tenants of the multitenant enterprise social network platform. In some implementations, each group can be identified by a group identifier ("GroupID") that is unique at least within the respective organization.

In some implementations, the database system 16 includes a "Group-User relationship object." The Group-User relationship object is a data structure that can be represented or conceptualized as a "Group-User Table" that associates groups to users subscribed to the respective groups. In some implementations, the Group-User Table includes all of the groups within the organization. In some other implementations, there can be a Group-User Table for each division, department, team or other sub-organization within an organization. In implementations in which the organization is a tenant of a multi-tenant enterprise social network platform, the Group-User Table can include all of the groups within all of the organizations that are tenants of the multitenant enterprise social network platform.

In some implementations, the Records object is a data structure that can be represented or conceptualized as a "Records Table" that associates records to information about or pertaining to the respective records including, for example, metadata about the records. In some implementations, the Records Table includes all of the records within the organization. In some other implementations, there can be a Records Table for each division, department, team or other sub-organization within an organization. In implementations in which the organization is a tenant of a multi-tenant enterprise social network platform, the Records Table can include all of the records within all of the organizations that are tenants of the multitenant enterprise social network platform. In some implementations, each record can be identified by a record identifier ("RecordID") that is unique at least within the respective organization.

In some implementations, the database system 16 includes a "Record-User relationship object." The Record-User relationship object is a data structure that can be represented or conceptualized as a "Record-User Table" that associates records to users subscribed to the respective records. In some implementations, the Record-User Table includes all of the records within the organization. In some other implementations, there can be a Record-User Table for each division, department, team or other sub-organization within an organization. In implementations in which the organization is a tenant of a multi-tenant enterprise social network platform, the Record-User Table can include all of the records within all of the organizations that are tenants of the multitenant enterprise social network platform.

In some implementations, the database system 16 includes a "Feed Items object." The Feed items object is a data structure that can be represented or conceptualized as a "Feed Items Table" that associates users, records and groups to posts, comments, documents or other publications to be displayed as feed items in the respective user feeds, record feeds and group feeds, respectively. In some implementations, the Feed Items Table includes all of the feed items within the organization. In some other implementations, there can be a Feed Items Table for each division, department, team or other sub-organization within an organization. In implementations in which the organization is a tenant of a multi-tenant enterprise social network platform, the Feed Items Table can include all of the feed items within all of the organizations that are tenants of the multitenant enterprise social network platform.

Enterprise social network news feeds are different from typical consumer-facing social network news feeds (for example, FACEBOOK®) in many ways, including in the way they prioritize information. In consumer-facing social networks, the focus is generally on helping the social network users find information that they are personally interested in. But in enterprise social networks, it can be, in some instances, applications, or implementations, desirable from an enterprise's perspective to only distribute relevant enterprise-related information to users and to limit the distribution of irrelevant information. In some implementations, relevant enterprise-related information refers to information that would be predicted or expected to benefit the enterprise by virtue of the recipients knowing the information, such as an update to a database record maintained by or on behalf of the enterprise. Thus, the meaning of relevance differs significantly in the context of a consumer-facing social network as compared with an employee-facing or organization member-facing enterprise social network.

In some implementations, when data such as posts or comments from one or more enterprise users are submitted to a network feed for a particular user, group, record or other object within an online enterprise social network, an email notification or other type of network communication may be transmitted to all users following the respective user, group, record or object in addition to the inclusion of the data as a feed item in one or more user, group, record or other feeds. In some online enterprise social networks, the occurrence of such a notification is limited to the first instance of a published input, which may form part of a larger conversation. For instance, a notification may be transmitted for an initial post, but not for comments on the post. In some other implementations, a separate notification is transmitted for each such publication, such as a comment on a post.

Figure 2A:
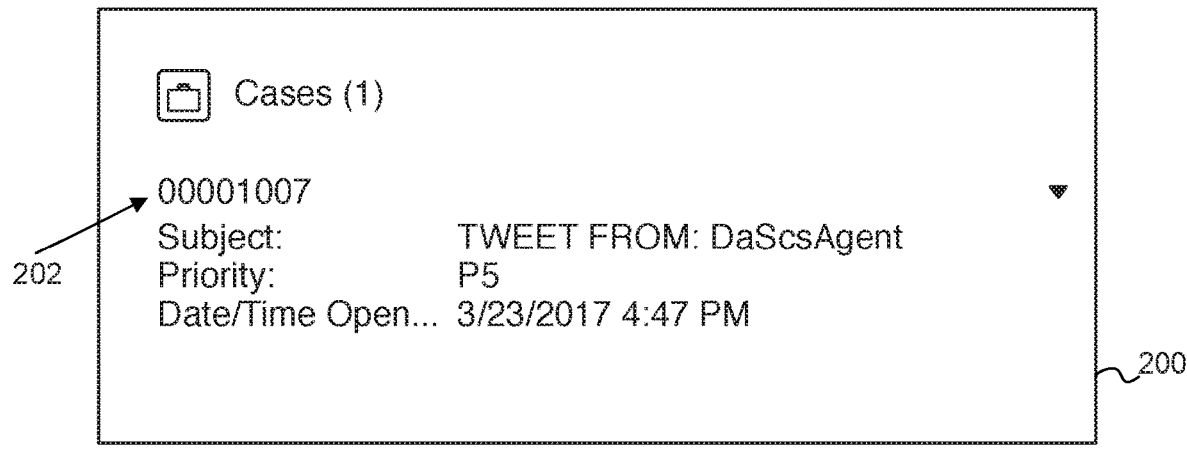
FIG. 2A is a screen shot of a graphical user interface (GUI) display, illustrating a case link for an electronic file, according to some implementations.

FIG. 2A is a screen shot of a graphical user interface (GUI) display 200, illustrating a case link 202 for an electronic file, according to some implementations. The GUI display 200 may be one implementation of the display 31 of the GUI 30 of the user system 12 (FIG. 1A). The electronic file may be a database record, a social media post, or some other electronic file accessible through the GUI display 200. In some implementations, the social media post may contain links to the database record as well as other menu options. As illustrated, associated with the case link 202 is a subject line, priority, and date and time it was last opened. Although not displayed, a hidden icon (204 in FIG. 2B) may be a menu option that is delivered to the GUI display 200 adjacent to and with the case link 202. Because the hidden icon 204 is hidden, it is not yet viewable. Furthermore, the user system 12 may ignore receipt of signals indicative of hovering, by the mouse device, over the hidden icon 204. In this way, the user system may not react to highlighting the hidden icon 204 until a keyboard action is taken to highlight the hidden icon 204 (FIG. 2B).

Figure 2B:
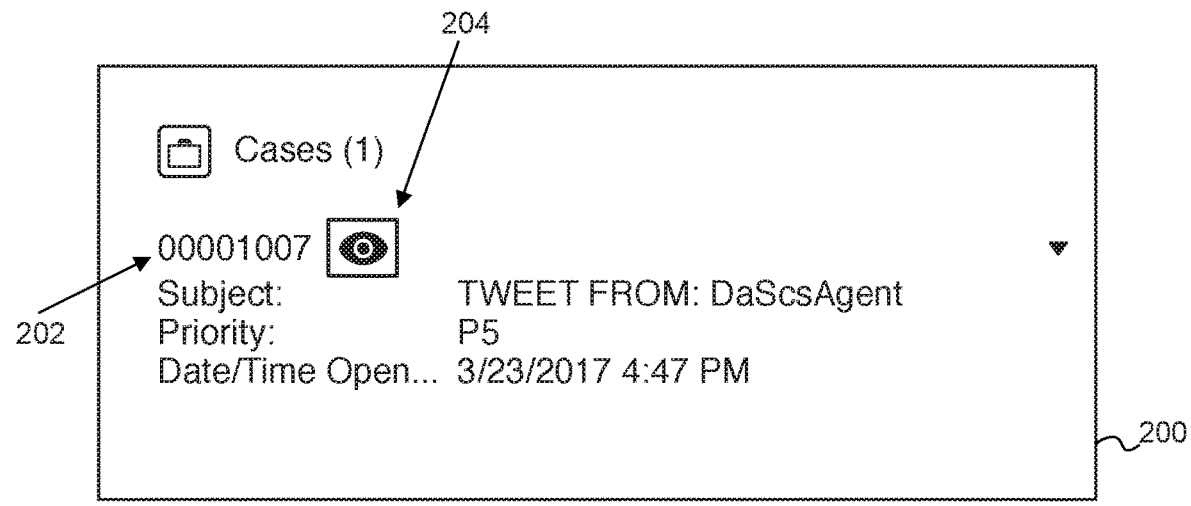
FIG. 2B is a screen shot of the GUI display of FIG. 2A, now illustrating a hidden icon adjacent to the case link, according to some implementations.

FIG. 2B is a screen shot of the GUI display 200 of FIG. 2A, now illustrating the hidden icon 204 adjacent to the case link 202, according to some implementations. The hidden icon 204 has become visible in response to receipt of a menu entry signal indicative of the keyboard device 15 highlighting the hidden icon 204 with a tab action (or some similar keyboard action). The highlighting of the hidden icon puts the hidden icon in focus, effectively placing any cursor associated with the keyboard on the hidden icon.

Figure 2C:
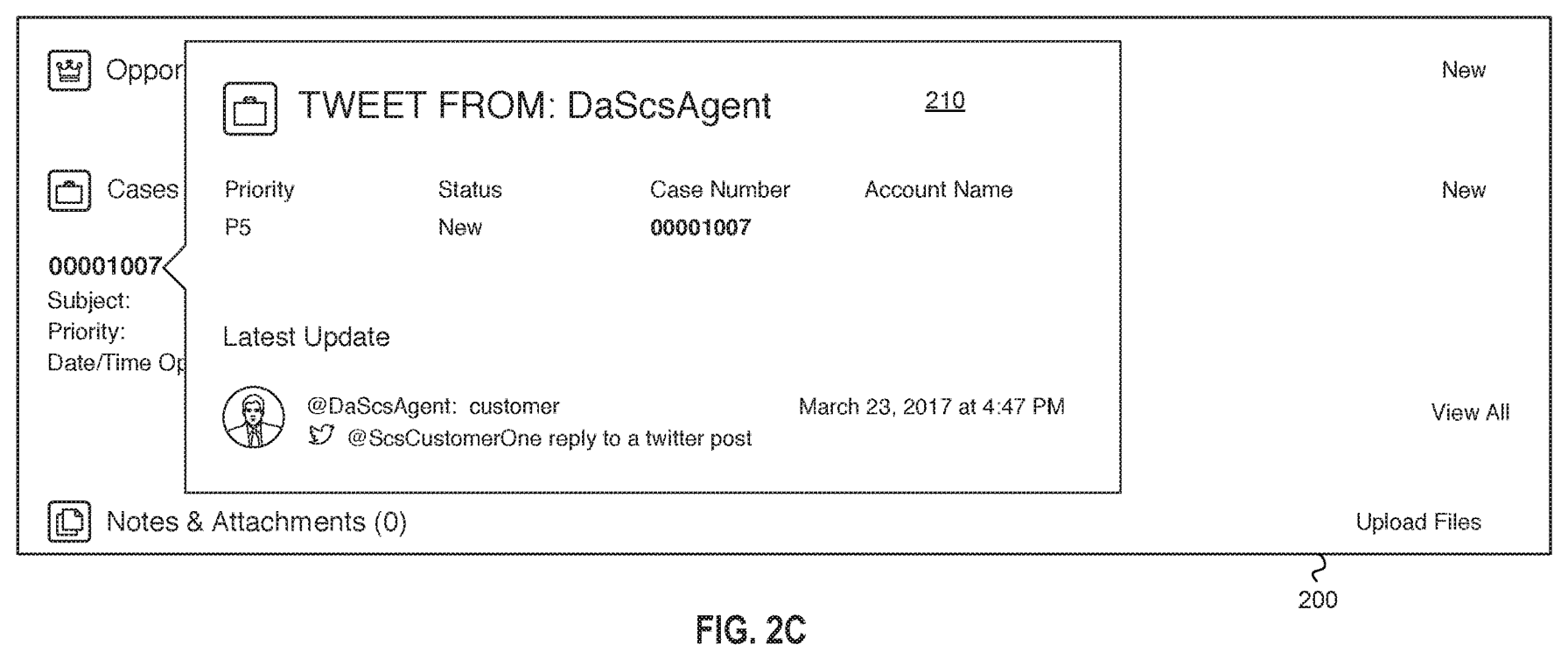

FIG. 2C is a screen shot of the GUI display 200 and an overlay window 210 (containing the electronic file) that has popped up responsive to a keyboard action on the hidden icon of FIG. 2B, according to some implementations, such as in response to a enter key or a return key of the keyboard device 15 being selected. Once the overlay window 210 has been displayed, the keyboard device 15 may direct the cursor into a field of the electronic file, and accept text input from the keyboard device 15. Such text may be stored as data associated with that particular field of the electronic file. Additionally, or alternatively, the keyboard device 15 may direct the cursor to a social media engagement option, or some other case management-related option, as will be discussed in more detail with reference to FIGS. 4A-4B.

Figure 3A:
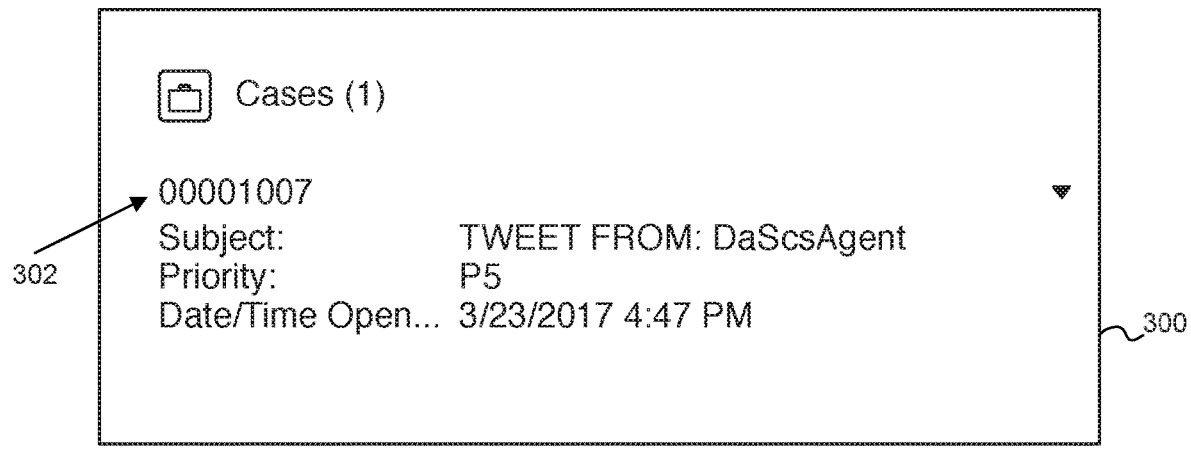
FIG. 3A is a screen shot of a GUI display, illustrating a case link for an electronic file, according to some implementations.

FIG. 3A is a screen shot of a GUI display 300, illustrating a case link 302 for an electronic file, according to some implementations. The GUI display 300 may be one implementation of the display 31 of the GUI 30 of the user system 12 (FIG. 1A). The electronic file may be a database record, a social media post, or some other electronic file accessible through the GUI display 300. In some implementations, the social media post may contain links to the database record as well as other menu options. As illustrated, associated with the case link 202 is a subject line, priority, and date and time it was last opened.

Figure 3B:
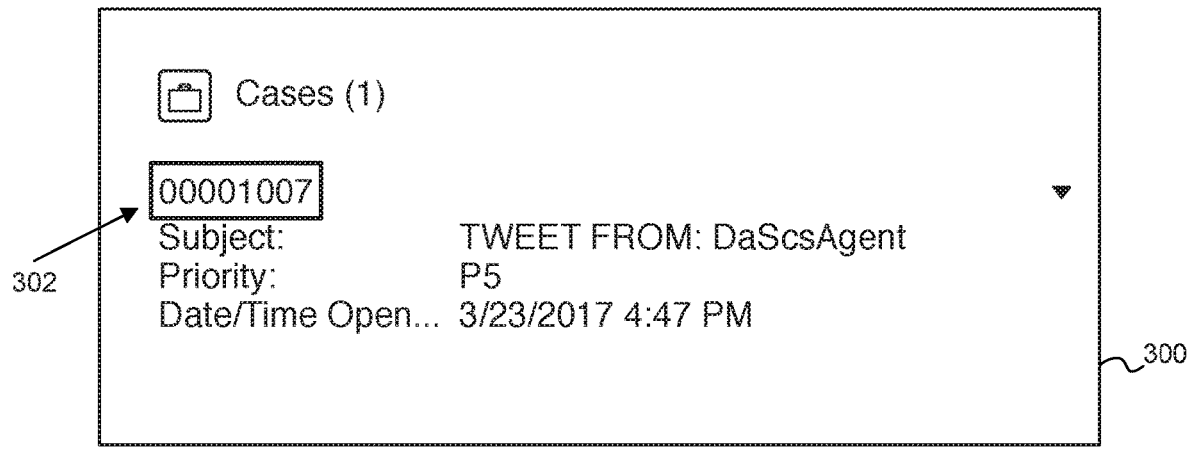
FIG. 3B is a screen shot of the GUI display of FIG. 3B, now illustrating highlighting of a hover targeted associated the case link using a keyboard action, according to some implementations.

FIG. 3B is a screen shot of the GUI display 300 of FIG. 3B, now illustrating highlighting of a hover target associated the case link 302 using a predetermined keyboard action (such as via a tab action or a shortcut key) of the keyboard device 15 that moves a cursor onto the hover target, according to various implementations. In one implementation, the case link 305 may act as a hover target while in other implementations a separate hover target is delivered to the GUI display 300 and associated with the case link 302. The end result, however, of the predetermined keyboard action may be to highlight (or otherwise move a cursor onto) the hover target associated with the case link 302.

Figure 3C:
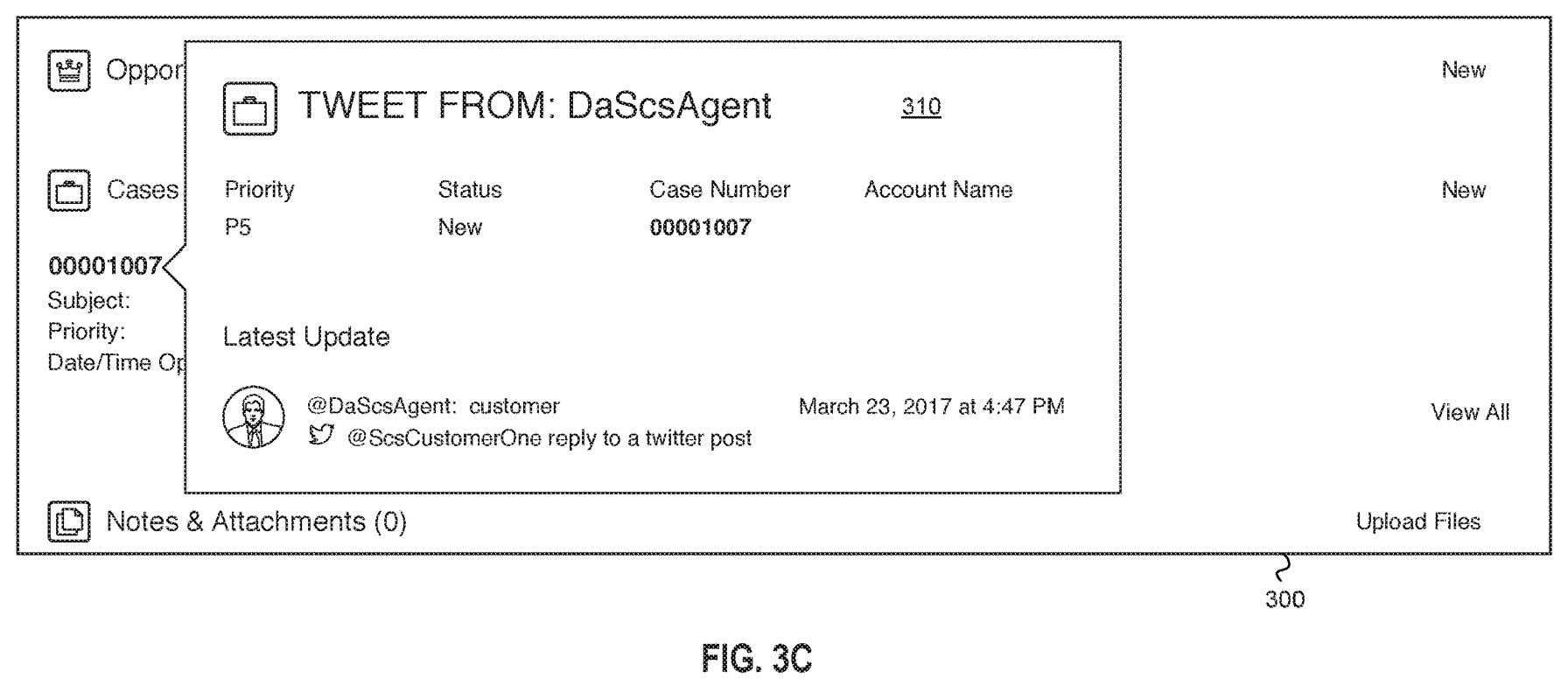

FIG. 3C is a screen shot of the GUI display 300 and an overlay window 310 that has popped up responsive to the hover target being highlighted for a predetermined period of time, according to some implementations. The predetermined period of time may be, for example, two seconds or three seconds or the like. In an alternative implementation, in which a shortcut key is used, the overlay window 310 may be launched without waiting the predetermined period of time, and may be further toggled on or off via the same shortcut key. Once the overlay window 210 has been displayed, the keyboard device 15 may direct the cursor into a field of the electronic file, and accept text input from the keyboard device 15. Such text may be stored as data associated with that particular field of the electronic file. Additionally, or alternatively, the keyboard device 15 may direct the cursor to a social media engagement option, or some other case management-related option, as will be discussed in more detail with reference to FIGS. 4A-4B.

Figure 4A:
FIG. 4A is a screen shot of another exemplary overlay window, illustrating actions that can be taken from hover functionality through a keyboard device, according to various implementations.

FIG. 4A is a screen shot of another exemplary overlay window 410, illustrating actions that can be taken from hover functionality through the keyboard device 15, according to various implementations. In the present examples, the actions may be taken with a single keyboard action or with more than one keyboard action. In the example of FIG. 4, the electronic file of the overlay window 410 is a social media post, which may also be associated with a database record or the like.

For example, with further reference to FIG. 4A, once the overlay window 410 is launched due to a hover action (FIGS. 2C and 3C), the GUI display 200 or 300 may respond to additional actions performed on the keyboard device 15. These additional actions may be taken with reference to various menu options, including other users 411 currently viewing the same database record (referred to as a "case" by way of example), an open case option 413, a close case option 415, a social media engagement option 417, and a social media post 419. The actions, therefore, may include but not be limited to expanding the social media post 419 to read more, selecting one of the social media engagement options 417 (such as to reply, like, or comment on the social media post), changing the status of the database record to open or closed. The user may also be able to read a description of the database record, and if necessary, expand the description to read more of the description. The user may use a tab action on the keyboard device 15 to highlight any of these options, and then a return or enter option to execute the highlighted option, although different keyboard operations may be used as well.

FIG. 4B is a screen shot of an exemplary database record 430 (also referred to as "case" herein), which may also be an overlay window, according to various implementations. For example, the database record 430 may be the overlay window 210 or 310 in the discussion put forth with reference to FIGS. 2C and 3C. Furthermore, the database record 430 may be launched in response to selection of the case number or either of the "Read more" links within the overlay window 410 of FIG. 4A. Once inside the database record 430, a user may fill in any empty fields to further complete the entries of the database record.

For example, the system 16 or the user system 12 ("system") may receive a selection signal indicative of selection, via the keyboard device 15, of a second tab action within the database record 430. The system may then move a cursor on the display 31 to an entry within the overlay in response to the selection signal. The entry may be a Contact Phone number (highlighted and contains cursor as illustrated in FIG. 4B), a Contact E-mail, Description, and other such information. Furthermore, in response to text entered within the entry, received from the keyboard device 15, the system may store the text as data in relation to the entry. Alternatively, or additionally, the system may detect selection of a radio button, check box, or dropdown menu and store a corresponding selection once chosen using the keyboard device 15 or the mouse 13. In this way, the database record may be quickly accessed and updated via an overlay or pop-up window.

Figure 5:
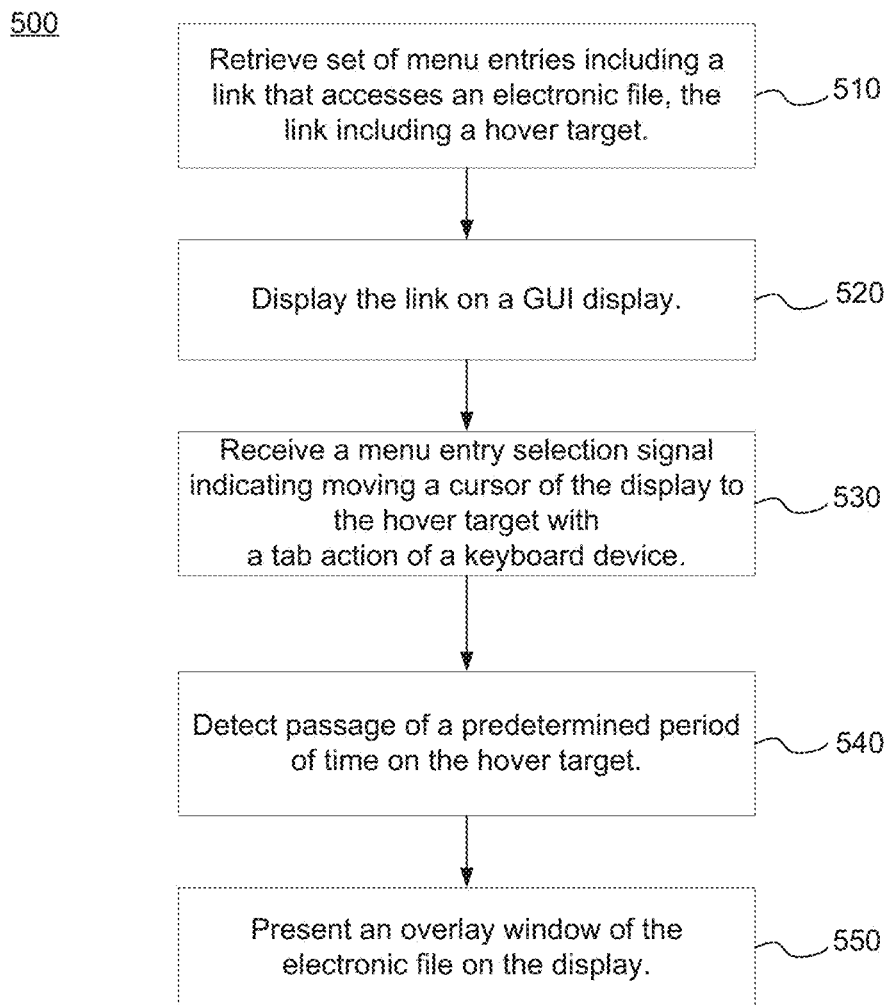
FIG. 5 is a flow diagram illustrating a method for activation of hover functionality through a keyboard device according to one implementation.

FIG. 5 is a flow diagram illustrating a method 500 for activation of hover functionality through a keyboard device according to one implementation. The method 500 may be performed by processing logic that comprises hardware (e.g., circuitry, dedicated logic, programmable logic, microcode, etc.), software (e.g., instructions run on a processor to perform hardware simulation), firmware, or a combination thereof. The processing logic may be configured to retrieve menu entries and respond to selection of certain of the menu entries. In one implementation, method 500 may be performed by either a user system 12 or a system 16, as shown in FIGS. 1A and 1B.

With further reference to FIG. 5, the method 500 may begin with a computer system retrieving a set of menu entries including a link that is selectable to access an electronic file, wherein the link includes a hover target (510). The method 500 may continue with the computer system displaying the link on a GUI display (520). The method 500 may continue with the computer receiving a menu entry selection signal indicative of the keyboard device moving a cursor of the display to the hover target with a predetermined action (530). In various implementations, the predetermined action may be a tab action or selection of a programmed shortcut key. The method 500 may continue with the computer system presenting, on the GUI display, an overlay window of the electronic file responsive to passage of a predetermined period of time, such as two or three seconds, for example (550). In an alternative embodiment, the programmed shortcut key may cause the overlay window to launch, without waiting any time, and the overlay window may be toggled on or off with that shortcut key.

Figure 6:
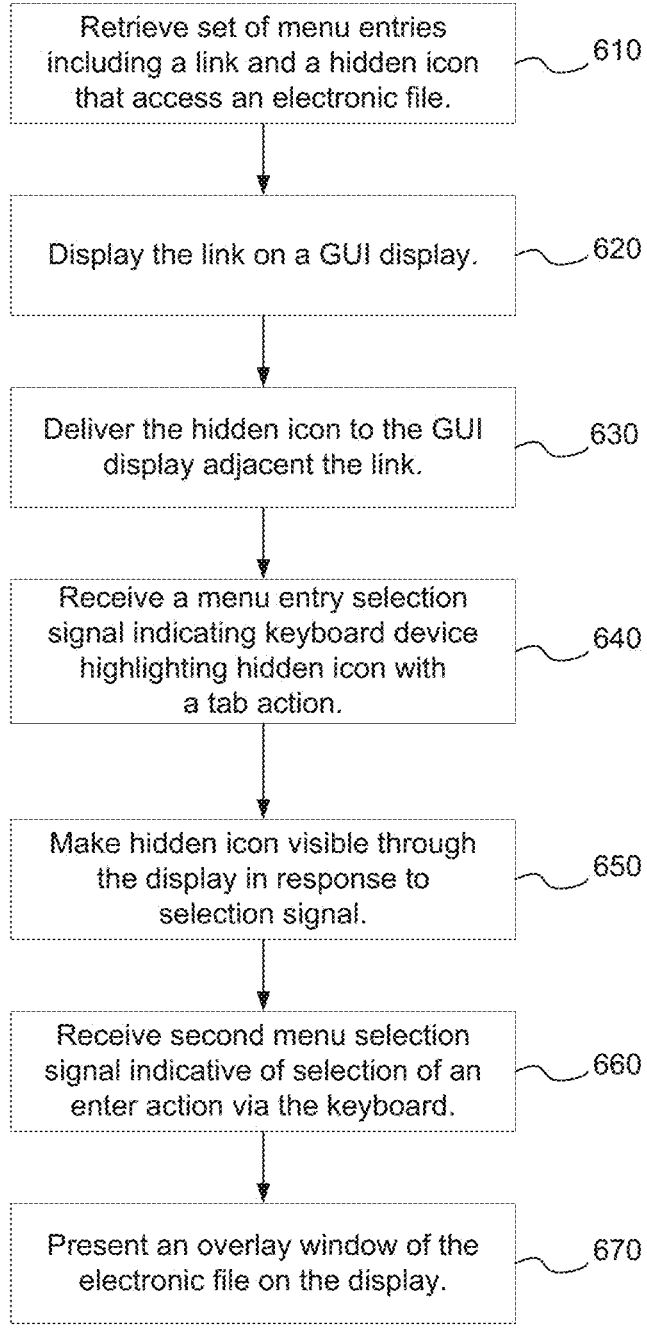
FIG. 6 is a flow diagram illustrating a method for activation of hover functionality through a keyboard device according to another implementation.

FIG. 6 is a flow diagram illustrating a method 600 for activation of hover functionality through a keyboard device according to another implementation. The method 600 may be performed by processing logic that comprises hardware (e.g., circuitry, dedicated logic, programmable logic, microcode, etc.), software (e.g., instructions run on a processor to perform hardware simulation), firmware, or a combination thereof. The processing logic may be configured to retrieve menu entries and respond to selection of certain of the menu entries. In one implementation, method 600 may be performed by either a user system 12 or a system 16, as shown in FIGS. 1A and 1B.

With further reference to FIG. 6, the method 600 may begin with a computer system retrieving a set of menu entries including a link and a hidden icon that are selectable to access an electronic file (610). The method 600 may continue with the computer system displaying the link on the GUI display (620). The method 600 may continue with the computer system delivering the hidden icon to the GUI display adjacent to the link (630). The method 600 may continue with the computer system receiving a menu entry selection signal indicative of the keyboard device highlighting the hidden icon with a tab action (or other keyboard action) (640). The method 600 may continue with the computer system making the hidden icon visible within the display in response to the menu entry selection signal (650). The method 600 may continue with the computer system receiving a second menu entry selection signal indicative of selection, via the keyboard device, of an enter action (or a return action or other predetermined action) (660). The method may continue with the computer system presenting, on the GUI display, an overlay window of the electronic file responsive to detecting the second menu entry selection signal while the hidden icon is visible (670).

It should be noted that the sequence of operations described in conjunction with methods 500 and 600 may be different from that illustrated, respectively, in corresponding FIGS. 5 and 6, unless otherwise explicitly required. The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, e.g., ORACLE®, DB2® by IBM, and the like without departing from the scope of the implementations claimed. Moreover, the implementations are applicable to other systems and environments including, but not limited to, client-server models, mobile technology and devices, wearable devices, and on-demand services.

Figure 7:
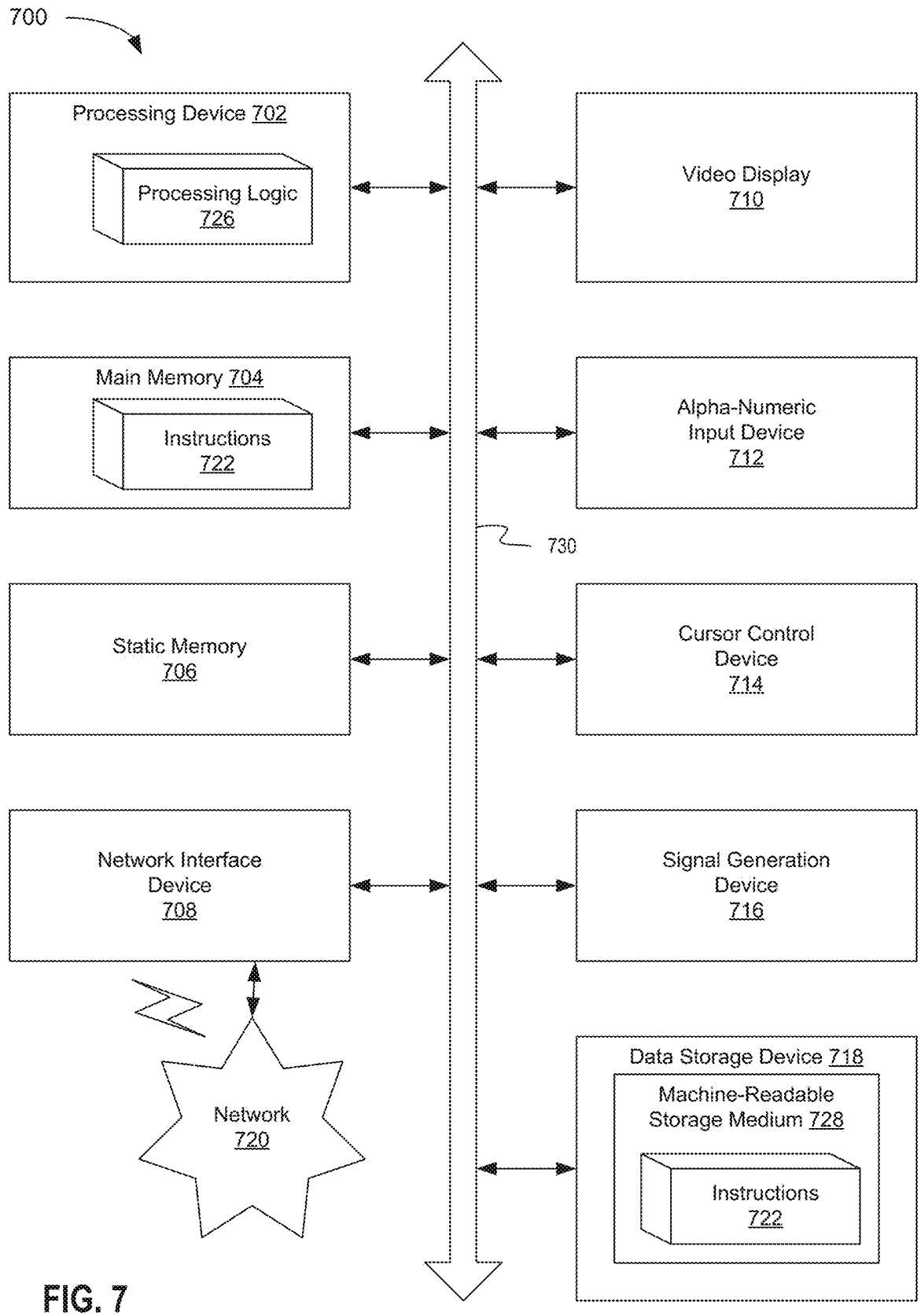
FIG. 7 is a block diagram illustrating an exemplary computer system, according to an implementation.

FIG. 7 illustrates a diagrammatic representation of a machine in the exemplary form of a computer system 700 within which a set of instructions, for causing the machine to perform any one or more of the methodologies discussed herein, may be executed. The system 700 may be in the form of a computer system within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, for example, computer system 700 may represent the user system 12, as shown in FIGS. 1A and 1B.

The exemplary computer system 700 includes a processing device (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730. The processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute the notification manager 210 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable medium 728 on which is stored one or more sets of instructions 722 (e.g., instructions of in-memory buffer service 114) embodying any one or more of the methodologies or functions described herein. The instructions 722 may also reside, completely or at least partially, within the main memory 704 and/or within processing logic 726 of the processing device 702 during execution thereof by the computer system 700, the main memory 704 and the processing device 702 also constituting computer-readable media. The instructions may further be transmitted or received over a network 720 via the network interface device 708.

While the computer-readable storage medium 728 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining;" "identifying;" "adding;" "selecting;" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. In a computer system having a processor, a keyboard device, a mouse device, and a graphical user interface (GUI) including a display device, a method of providing and selecting from a menu on the display device, the method comprising:
 retrieving, by the processor, a link and a hidden icon that are selectable to access an identical electronic file;
 displaying, by the processor, the link on the display device;
 delivering, by the processor, the hidden icon to the display device adjacent to the link;
 ignoring receipt of signals indicative of hovering, by the mouse device, over the hidden icon;
 receiving, by the processor from the keyboard device, a selection signal indicative of the keyboard device highlighting the hidden icon with a tab action in association with the link; and
 in response to the selection signal, by the processor:
  making the hidden icon visible within the display device; and
  activating, on the hidden icon after making the hidden icon visible, a cursor associated with the keyboard device;
 receiving a second selection signal indicative of selection, via the keyboard device, of an enter action; and
 responsive to detecting the second selection signal while the hidden icon is visible, presenting, on the display device, an overlay window of the identical electronic file.

2. The method of claim 1, further comprising:
 receiving a second selection signal indicative of selection, via the keyboard device, of a second tab action within the overlay window;
 moving the cursor on the display device to an entry within the overlay window in response to the second selection signal; and
 responsive to text entered within the entry, received from the keyboard device, storing the text as data in relation to the entry.

3. The method of claim 1, wherein the pop up overlay window is a social media post, the method further comprising:
 receiving a third selection signal indicative of selection, via the keyboard device, of a second tab action within the overlay window;
 moving a cursor on the display device to a social engagement option on the social media post in response to receiving the third selection signal;
 receiving a fourth selection signal indicative of selection, via the keyboard device, of an enter action; and
 responsive to detecting the fourth selection signal, performing a social-related action that engages the social engagement option.

4. A system comprising:
 a processing device;
 a memory coupled to the processing device, the memory to store instructions;
 a keyboard device coupled to the processing device;
 a graphical user interface (GUI) including a display device, which is coupled to the processing device and the memory; and
 wherein the processing device is to execute the instructions to:
  retrieve a link and a hidden icon that are selectable to access an identical electronic file;
  display the link on the display device;
  display the hidden icon adjacent to the link on the display device;
  ignore receipt of signals indicative of hovering, by a mouse device, over the hidden icon;
  receive a selection signal indicative of the keyboard device highlighting the hidden icon with a tab action in association with the link; and
  in response to the selection signal:
   make the hidden icon visible within the display device; and
   activate, on the hidden icon after making the hidden icon visible, a cursor associated with the keyboard device;
  receive a second selection signal indicative of selection, via the keyboard device, of an enter action; and
  responsive to detecting the second selection signal while the hidden icon is visible, present, on the display device, an overlay window of the identical electronic file.

5. The system of claim 4, wherein the processing device is to execute the instructions further to:
 receive a second selection signal indicative of selection, via the keyboard device, of a second tab action within the overlay window;
 moving the cursor on the display device to an entry within the overlay window in response to the second selection signal; and
 responsive to text entered within the entry, received from the keyboard device, store the text as data in relation to the entry.

6. The system of claim 4, wherein the overlay window is a social media post, and wherein the processing device is to execute the instructions further to:
   receive a third selection signal indicative of selection, via the keyboard device, of a second tab action within the overlay window;
   move a cursor on the display device to a social engagement option on the social media post in response to receiving the third selection signal;
   receive a fourth selection signal indicative of selection, via the keyboard device, of an enter action; and
   responsive to detecting the fourth selection signal, performing a social-related action that engages the social engagement option.

7. In a computer system having a processor, a keyboard device, a mouse device, and a graphical user interface (GUI) including a display device, a non-transitory computer-readable storage medium storing instructions, which when executed by the processor, perform a plurality of operations comprising:
   retrieving, by the processor, a link that is selectable to access an identical electronic file, wherein the link includes a hover target;
   displaying, by the processor, the link on the display device;
   ignore, by the processor, receipt of signals indicative of hovering, by the mouse device, over the hover target;
   receiving, by the processor, a selection signal indicative of the keyboard device moving a cursor of the display device to the hover target with a predetermined action in association with the link; and
   in response to the selection signal, by the processor:
      making the hover target visible within the display device; and
      activating, on the hover target after making the hover target visible, a cursor associated with the keyboard device;
   receiving a second selection signal indicative of selection, via the keyboard device, of an enter action; and
   responsive to detecting the second selection signal while the hover target is visible, presenting, on the display device, an overlay window of the identical electronic file.

8. The non-transitory computer-readable storage medium of claim 7, wherein the predetermined action comprises performing a tab action.

9. The non-transitory computer-readable storage medium of claim 7, wherein the predetermined action comprises selection of a predetermined shortcut key.

10. The non-transitory computer-readable storage medium of claim 7, wherein the plurality of operations further comprises, in response to passage of a predetermined period of time, presenting, on the display device, an overlay window of the identical electronic file, and wherein the predetermined period of time comprises one of two or three seconds.

11. The non-transitory computer-readable storage medium of claim 10, wherein the plurality of operations further comprise:
   receiving a second selection signal indicative of selection, via the keyboard device, of a tab action taken within the overlay window;
   moving a cursor on the display device to an entry within the overlay window in response to the second selection signal; and
   responsive to text entered within the entry, received from the keyboard device, store the text as data in relation to the entry.

12. The non-transitory computer-readable storage medium of claim 10, wherein the overlay window is a social media post, and wherein the plurality of operations further comprise:
   receiving a second selection signal indicative of selection, via the keyboard device, of a tab action taken within the overlay window;
   moving the cursor on the display device to a social engagement option on the social media post in response to receiving the second selection signal;
   receiving a third selection signal indicative of selection, via the keyboard device, of an enter action while the cursor is on the social engagement option; and
   responsive to detecting the third selection signal, performing a social-related action that engages the social engagement option.

13. In a computer system having a processor, a keyboard device, a mouse device, and a graphical user interface (GUI) including a display device, a method providing and selecting from a menu of the display device, the method comprising:
   retrieving, by the processor, a link that is selectable to access an identical electronic file, wherein the link includes a hover target;
   displaying, by the processor, the link on the display device;
   ignoring, by the processor, receipt of signals indicative of hovering, by the mouse device, over the hover target;
   receiving, by the processor, a selection signal indicative of the keyboard device moving a cursor of the display device to the hover target with a predetermined action in association with the link; and
   in response to the selection signal, by the processor:
      making the hover target visible within the display device; and
      activating, on the hover target after making the hover target visible, a cursor associated with the keyboard device;
   receiving a second selection signal indicative of selection, via the keyboard device, of an enter action; and
   responsive to detecting the second selection signal while the hover target is visible, presenting, on the display device, an overlay window of the identical electronic file.

14. The method of claim 13, wherein the predetermined action comprises performing one of a tab action or a predetermined shortcut key on the keyboard device.

\* \* \* \* \*